(12) United States Patent
Huard et al.

(10) Patent No.: US 10,663,954 B2
(45) Date of Patent: May 26, 2020

(54) METHOD OF MATCHING A DIAGNOSTIC MODULE TO A MEASUREMENT MODULE MOUNTED IN AN AUTOMOTIVE VEHICLE WHEEL

(71) Applicants: Continental Automotive France, Toulouse (FR); Continental Automotive GmbH, Hannover (DE)

(72) Inventors: Jean-Charles Huard, Toulouse (FR); Olivier Fudulea, Tours (FR); Jean-Philippe Boisset, Montauban (FR)

(73) Assignees: Continental Automotive France (FR); Continental Automotive GmbH (DE)

( * ) Notice: Subject to any disclaimer, the term of this patent is extended or adjusted under 35 U.S.C. 154(b) by 0 days.

(21) Appl. No.: 16/470,595

(22) PCT Filed: Dec. 18, 2017

(86) PCT No.: PCT/FR2017/053651
§ 371 (c)(1),
(2) Date: Jun. 18, 2019

(87) PCT Pub. No.: WO2018/115683
PCT Pub. Date: Jun. 28, 2018

(65) Prior Publication Data
US 2019/0310614 A1    Oct. 10, 2019

(30) Foreign Application Priority Data

Dec. 23, 2016    (FR) .................................... 16 63285

(51) Int. Cl.
*G05B 19/418* (2006.01)
*H04L 29/06* (2006.01)
(Continued)

(52) U.S. Cl.
CPC ...... *G05B 19/41805* (2013.01); *H04L 9/0866* (2013.01); *H04L 63/0428* (2013.01);
(Continued)

(58) Field of Classification Search
CPC ..... H04L 2209/84; H04L 9/0822; H04L 9/30; H04L 63/0428; H04L 9/0866;
(Continued)

(56) References Cited

U.S. PATENT DOCUMENTS

| 7,508,302 B2 | 3/2009 | Watabe | |
| 2002/0130771 A1* | 9/2002 | Osborne | B60C 23/005 340/438 |

(Continued)

FOREIGN PATENT DOCUMENTS

FR          2892550 A1    4/2007

OTHER PUBLICATIONS

English Translation of Written Opinion for International Application No. PCT/FR2017/053651, dated Apr. 6, 2018, 4 pages.
(Continued)

*Primary Examiner* — Mohammad K Islam
(74) *Attorney, Agent, or Firm* — RatnerPrestia

(57) ABSTRACT

A method for associating a diagnostic module of an assembly line for assembling automotive vehicle wheels with a measurement module fitted in a wheel assembled on the assembly line. The method includes a step of encryption, by using the identifier of an assembly line as an encryption key, of at least one part of the response message and a step of decryption of the encrypted response message by using the identifier of its assembly line as a decryption key in such a way as to ensure that the measurement module is associated with the assembly line.

11 Claims, 3 Drawing Sheets

(51) Int. Cl.
*H04L 9/08* (2006.01)
*H04W 12/00* (2009.01)
*H04W 12/02* (2009.01)
*H04W 4/40* (2018.01)

(52) U.S. Cl.
CPC ........... *H04L 63/0435* (2013.01); *H04W 4/40* (2018.02); *H04W 12/001* (2019.01); *H04W 12/02* (2013.01); *G05B 2219/36542* (2013.01); *H04L 2209/84* (2013.01); *Y02P 90/04* (2015.11)

(58) Field of Classification Search
CPC .......... H04L 63/0435; G05B 19/41805; G05B 2219/36542; H04W 12/02; H04W 4/40; H04W 12/001
See application file for complete search history.

(56) References Cited

U.S. PATENT DOCUMENTS

| | | | | |
|---|---|---|---|---|
| 2005/0093686 | A1* | 5/2005 | LeMense | B60C 23/0408 340/442 |
| 2006/0075135 | A1* | 4/2006 | Rambhia | H04L 9/36 709/238 |
| 2006/0077037 | A1* | 4/2006 | Luo | B60R 25/24 340/5.72 |
| 2006/0130033 | A1* | 6/2006 | Stoffels | G06F 8/61 717/166 |
| 2007/0090970 | A1* | 4/2007 | Watabe | B60C 23/0462 340/901 |
| 2013/0322629 | A1 | 12/2013 | Zucchetti et al. | |
| 2015/0020152 | A1* | 1/2015 | Litichever | H04L 63/08 726/1 |
| 2015/0039889 | A1* | 2/2015 | Andoni | H04L 9/0825 713/170 |
| 2015/0228126 | A1* | 8/2015 | Cimpean | H04W 12/00 705/13 |
| 2016/0248740 | A1* | 8/2016 | Peirce | H04L 9/0819 |
| 2016/0352690 | A1* | 12/2016 | Wu | H04L 9/0819 |
| 2017/0070488 | A1* | 3/2017 | Jun | H04L 9/30 |
| 2017/0072875 | A1* | 3/2017 | Kim | H04L 9/3226 |
| 2017/0200324 | A1* | 7/2017 | Chennakeshu | H04L 63/062 |
| 2017/0201500 | A1* | 7/2017 | Tormasov | H04L 63/0428 |
| 2017/0243485 | A1* | 8/2017 | Rubin | G08G 1/052 |
| 2017/0310674 | A1* | 10/2017 | Markham | B60R 16/0231 |
| 2017/0352215 | A1* | 12/2017 | Maiwand | G07C 9/00896 |
| 2018/0027600 | A1* | 1/2018 | Lawlis | G06K 9/325 713/168 |
| 2018/0062996 | A1* | 3/2018 | Lei | H04L 43/028 |
| 2018/0084412 | A1* | 3/2018 | Alfred | H04L 67/28 |
| 2019/0222423 | A1* | 7/2019 | Takemori | H04L 63/123 |

OTHER PUBLICATIONS

International Search Report and Written Opinion for International Application No. PCT/FR2017/053651, dated Apr. 6, 2018, 6 pages.

* cited by examiner

METHOD OF MATCHING A DIAGNOSTIC MODULE TO A MEASUREMENT MODULE MOUNTED IN AN AUTOMOTIVE VEHICLE WHEEL

CROSS REFERENCE TO RELATED APPLICATIONS

This application is the U.S. National Phase Application of PCT International Application No. PCT/FR2017/053651, filed Dec. 18, 2017, which claims priority to French Patent Application No. 1663285, filed Dec. 23, 2016, the contents of such applications being incorporated by reference herein.

FIELD OF THE INVENTION

The present invention pertains to the automotive sector and relates more particularly to a method of matching between a diagnostic module of a production line for fitting automotive vehicle wheels and a measurement module fitted in a wheel assembled on said production line. The invention is in particular aimed at reducing, or indeed eradicating, the matching errors observed on existing production lines for fitting wheels.

BACKGROUND OF THE INVENTION

During the process of manufacturing an automotive vehicle, it is known to assemble the wheels of the vehicle on a dedicated production facility, independently of the remainder of the vehicle. This makes it possible in particular to optimize wheel fitting times, to improve the reliability of quality control checks and to reduce costs.

In a known manner, a wheel assembly facility comprises several assembly lines disposed side by side and which each comprise a robot of press type allowing the tires to be fitted on the rims.

In order to be able to verify the value of certain parameters of a wheel once the latter has been assembled, such as for example the pressure or the internal temperature of the tires, it is known to fit a measurement module, a so-called "TPMS" ("Tire Pressure Measurement System"), inside the tire or on the rim before assembling the wheel.

This measurement module comprises one or more sensors, for example for measuring pressure, temperature or acceleration, and is configured at one and the same time to receive request messages and, in return, to dispatch response messages comprising the values of parameters measured by the sensors as well as the identifier of the measurement module.

In order to allow the checking of these parameters on the assembly line, it is known to use a diagnostic module which will communicate with the measurement module of each of the wheels assembled on the line, in particular so as to collect its identifier and to associate (or match) said identifier with the wheel, for example by using a barcode stuck on the tire.

Each assembly line comprises its own diagnostic module which emits signals comprising a request message destined in turn for each measurement module of a wheel assembled on said line. These signals are emitted in a known manner on a low-frequency communication link, also called LF (for "Low-Frequency") link, this type of link making it possible in particular to check the distance and the direction of the signal so as to ensure that a diagnostic module interrogates only a single measurement module, namely the measurement module closest to the diagnostic module.

A request message comprises in a known manner a code making it possible to request a predefined list of parameters, in particular the identifier of the measurement module, for which the diagnostic module wishes to obtain values. The measurement module responds to the diagnostic module by dispatching a signal comprising a response message comprising the values of the parameters indicated by the code in the request message. This signal is emitted in a known manner on a radiofrequency communication link, also called RF (for "Radio-Frequency") link, in particular so as to avoid using the same range of frequencies for emission and for reception and to reduce costs, a radiofrequency emission device being less expensive in terms of energy and therefore in terms of maintenance than a low-frequency emission device.

However, in contradistinction to a request message emitted on a low-frequency communication link, a response message emitted by a measurement module on a radiofrequency communication link could be received by a plurality of diagnostic modules.

Thus, each assembly line possessing its own diagnostic module and each measurement module using the same range of radiofrequencies, a response message dispatched by a measurement module of a first assembly line may be received by the diagnostic module of a neighboring second assembly line.

Moreover, each measurement module can dispatch information messages without having received any request message beforehand, for example following periodic measurements of pressure or of acceleration or when an event occurs on the tire (leak, rolling, etc.). These information messages are characteristic of the standard mode of operation of the measurement module when it is fitted in a wheel which is itself fitted on a vehicle. However, these information messages, in particular the periodic information messages, may be emitted when the measurement module is fitted in a wheel disposed on an assembly line.

Hence, when a diagnostic module receives a message, it is not able to determine whether this message is a response message in response to a request that it has dispatched or a response message intended for another diagnostic module or else an information message.

SUMMARY OF THE INVENTION

An aspect of the invention is therefore aimed at remedying these drawbacks at least in part by proposing a simple, reliable and effective solution to allow a diagnostic module to identify a measurement module which is on its production line by using the existing message formats.

To this end, an aspect of the invention is firstly a method for associating a diagnostic module of an assembly line for assembling automotive vehicle wheels with a measurement module fitted in a wheel assembled on said assembly line, said wheel being characterized by a plurality of parameters.

The method is noteworthy in that it comprises the steps:
of dispatching, by the diagnostic module, of a request message comprising an identifier of the assembly line with which said diagnostic module is associated and at least one request code in respect of a value of at least one wheel parameter,
of reception, by a measurement module of the assembly line, of the request message dispatched,
of generation of a response message by said measurement module, said response message comprising at least the identifier of said measurement module and a value of at least one parameter corresponding to the request code inserted into the request message received, of encryption, by using the identifier of the assembly line as an encryption key, of at least one part of the response message generated, of dispatching, by the measurement module, of the encrypted response message, of reception, by the diagnostic module, of the response message dispatched, and of decryption of the response message received by the diagnostic module by using the identifier of its assembly line as a decryption key in such a way as to ensure that the measurement module is associated with said assembly line.

By securing the data transmitted by the measurement module with the aid of the identifier of the production line, the method according to an aspect of the invention allows the diagnostic module to be assured in a reliable and repeatable manner that the data received do indeed originate from the interrogated measurement module. The method according to an aspect of the invention furthermore makes it possible to avoid modifying the format of the response messages dispatched by the measurement module, in particular so that they include an additional field reserved for the identifier of the assembly line, such a modification being complex and expensive since it would make it necessary to modify the diagnostic modules and to provide for the reception and the insertion into each response message of the identifier of the assembly line by each measurement module. Moreover, the identifier of the assembly line being added to the end of a request message by the diagnostic module, each measurement module can use it or ignore it depending on whether or not it is configured to do so, thereby allowing, in particular, interoperability between an assembly line of a system of the prior art and a measurement module according to an aspect of the invention or between an assembly line of a system according to an aspect of the invention and a measurement module of the prior art.

It will be noted that an obvious solution for the person skilled in the art for determining whether a message received by a diagnostic module is a response message in response to a request that it has dispatched or a response message intended for another diagnostic module or else an information message, would have been to mutually synchronize the diagnostic modules of the various assembly lines so as to ensure that each diagnostic module in turn undertakes the emission of a request followed by the reception of the corresponding response message. However, such a solution would turn out to be appreciably time consuming, complex and expensive and would not make it possible to avoid the reception and the processing of the information messages by each of the diagnostic modules.

In a preferred embodiment, the encryption comprises the insertion by the measurement module of a checksum into the response message.

Preferably, the checksum corresponds to the sum of the identifier of the measurement module, of the value or values of the parameters corresponding to the request code inserted into the request message received and of the assembly line identifier received in the request message.

Preferably, the values of the identifier of the measurement module, of the parameters corresponding to the request code inserted into the request message received and of the identifier of the assembly line being hexadecimal or binary characters, the sum is carried out by applying the "exclusive or" operator (XOR) or the "and" operator (AND).

As a variant, the encryption can comprise the use by the measurement module of a division operator on the response message, for example of Redundant Cyclic Code type (CRC or "Cyclic Redundancy Check").

An aspect of the invention also relates to a measurement module intended to be fitted in an automotive vehicle wheel, said measurement module being characterized by an identifier. The measurement module is noteworthy in that it is configured to receive, from a diagnostic module, a request message comprising the identifier of the assembly line with which said diagnostic module is associated and at least one request code in respect of a value of at least one wheel parameter, to generate a response message comprising at least the identifier of said measurement module and a value of at least one parameter corresponding to the request code inserted into a request message received, to encrypt, by using the identifier of the assembly line as an encryption key, at least one part of the response message generated, and to dispatch a response message thus encrypted destined for the diagnostic module.

By the terms "the assembly line with which said diagnostic module is associated" is meant the assembly line on which the diagnostic module is placed.

Preferably, the measurement module is configured to encrypt a part of the response message by inserting a checksum into said response message, a checksum field advantageously being provided in the response messages.

Preferably, the checksum corresponds to the sum of the identifier of said measurement module, of the value or values of the parameters measured by the measurement module and of the identifier of the assembly line.

Preferably, the values of the identifier of the measurement module, of the parameters corresponding to the request code inserted into the request message received and of the identifier of the assembly line being hexadecimal or binary characters, the sum is carried out by applying the "exclusive or" (XOR) or "and" (AND) operator.

As a variant, the encryption can comprise the use by the measurement module of a division operator on the response message, for example of Redundant Cyclic Code (CRC) type or an encryption complying with the "Advanced Encryption Standard" (AES).

According to one aspect of the invention, the request message is received in a signal on a low-frequency communication link so that it is received by a single measurement module only.

According to another aspect of the invention, the encrypted response message is dispatched in a signal emitted on a radiofrequency communication link so as to reduce costs, in particular the energy-related cost.

An aspect of the invention also relates to a wheel for an automotive vehicle, said wheel comprising a measurement module such as presented previously.

An aspect of the invention also relates to an automotive vehicle comprising at least one wheel such as presented previously.

An aspect of the invention also relates to a diagnostic module of an assembly line for an automotive vehicle wheels. The diagnostic module is noteworthy in that it is configured to dispatch a request message comprising an identifier of the assembly line with which said diagnostic module is associated, and at least one request code in respect of a value of at least one wheel parameter, to receive an encrypted response message dispatched by a measurement module, said response message comprising at least the identifier of said measurement module and a value of at least one parameter corresponding to the request code inserted into a request message dispatched, and to decrypt an encrypted message received by using the identifier of the assembly line as a decryption key in such a way as to ensure that the measurement module is associated with said assembly line.

Preferably, a checksum corresponding to the sum of the identifier of a measurement module, of the value or values of the parameters and of the identifier of the assembly line being inserted into a response message received, the diagnostic module is configured to decrypt said response message by applying an operator to said checksum.

Preferably, the sum is carried out by applying the "exclusive or" operator (XOR) or the "and" operator (AND).

Alternatively, the decryption is carried out by using a Redundant Cyclic Code (CRC) or a decryption complying with the "Advanced Encryption Standard" (AES).

According to one aspect of the invention, the request message is dispatched in a signal emitted on a low-frequency communication link.

According to another aspect of the invention, the encrypted response message is received in a signal on a radiofrequency communication link.

An aspect of the invention relates finally to a system for assembling automotive vehicle wheels, said system being noteworthy in that it comprises a plurality of assembly lines for automotive vehicle wheels, each wheel of each assembly line comprising a measurement module such as presented previously, each assembly line being associated with a unique identifier and comprising a diagnostic module such as presented previously.

BRIEF DESCRIPTION OF THE DRAWINGS

Other characteristics and advantages of aspects of the invention will become apparent during the description which follows, offered with regard to the appended figures which are given by way of nonlimiting examples and in which similar objects are given identical references.

DETAILED DESCRIPTION OF THE PREFERRED EMBODIMENTS

Figure 1:
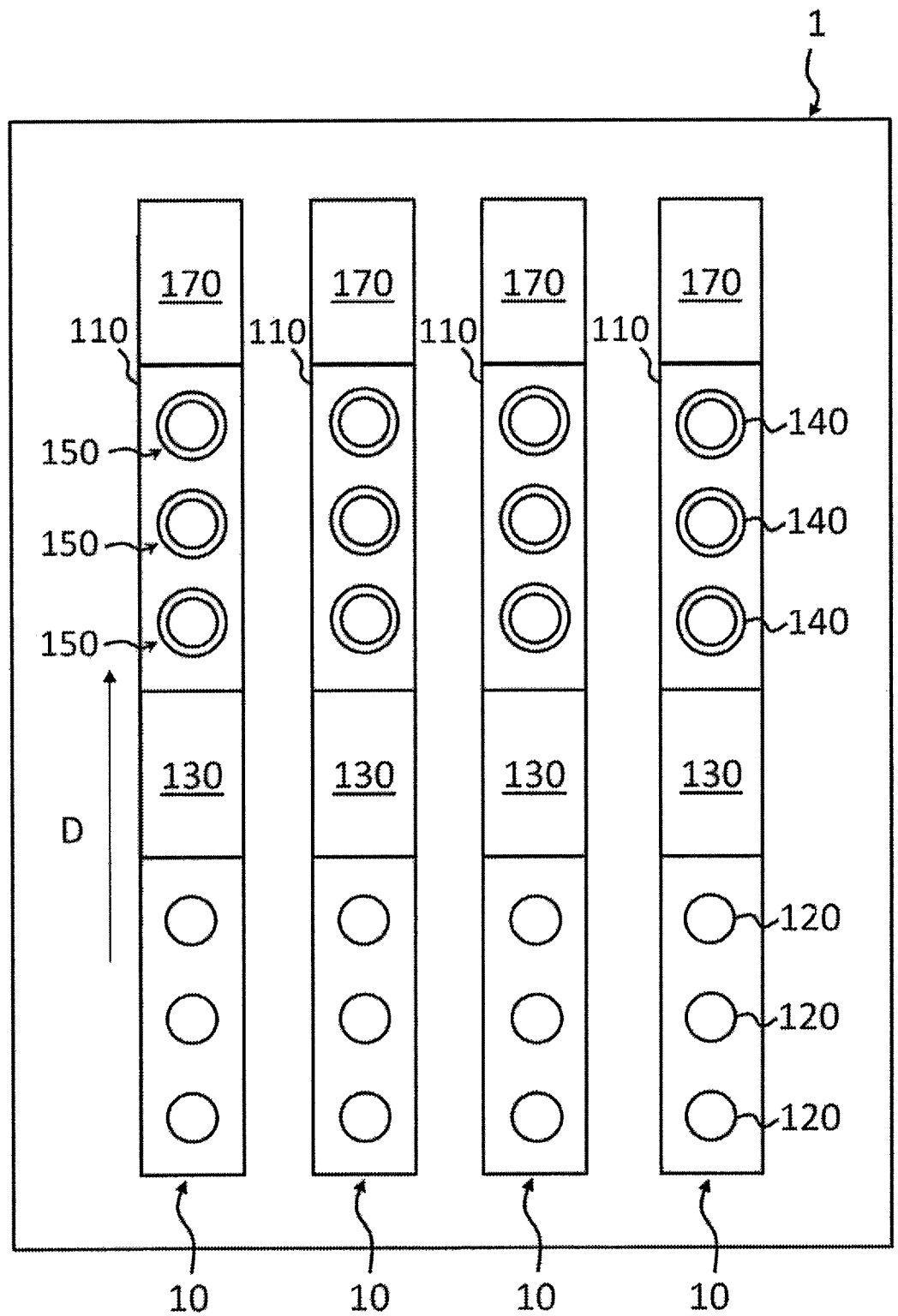
FIG. 1 schematically illustrates an embodiment of the system according to an aspect of the invention.

Represented schematically in FIG. 1 is an assembly facility 1 for wheels 150 which are intended to be fitted subsequently on an automotive vehicle (not represented).

This assembly facility 1 comprises a plurality of assembly lines 10 disposed alongside one another. Each assembly line 10 comprises a conveying facility 110 on which are placed rims 120 moving in a direction D. A robot 130 of press type makes it possible to assemble a tire 140 onto each rim 120 of the conveying facility 110 so as to form a wheel 150.

Figure 2:
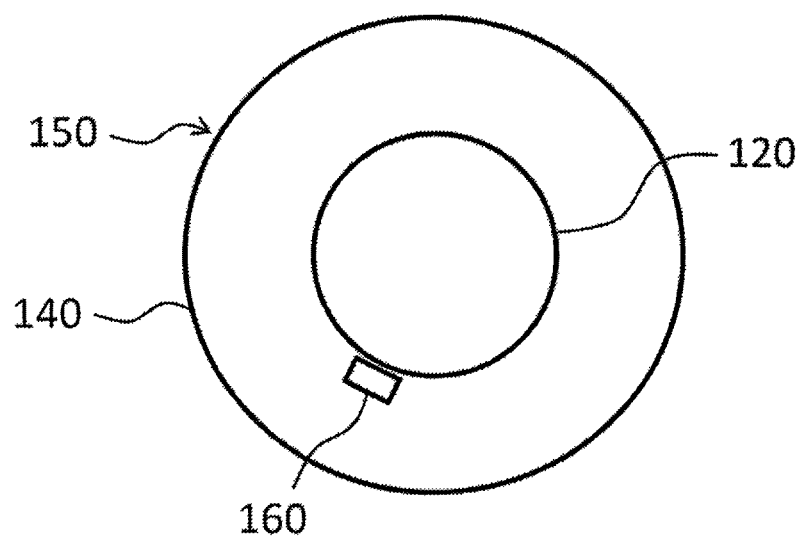
FIG. 2 schematically illustrates an automotive vehicle wheel comprising a measurement sensor fitted on the rim.
Figure 3:
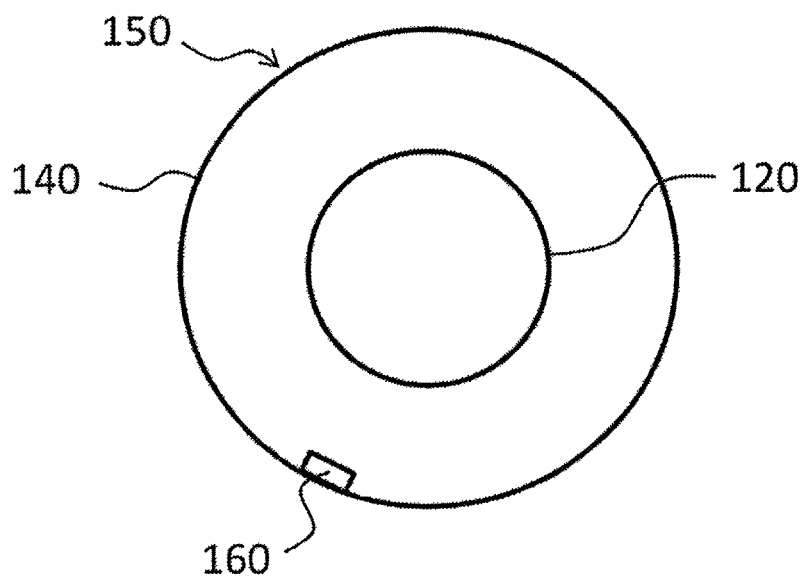
FIG. 3 schematically illustrates an automotive vehicle wheel comprising a measurement sensor fitted on the tire.
Figure 4:
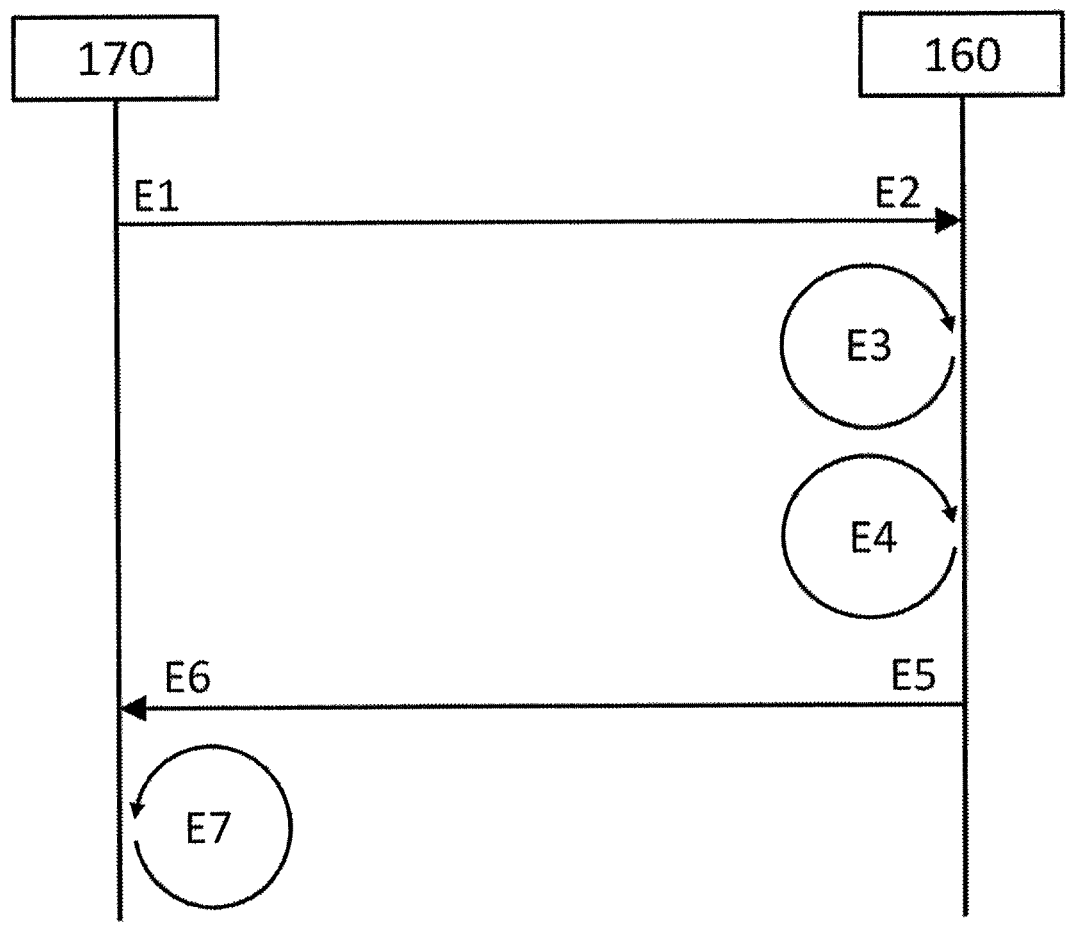
FIG. 4 schematically illustrates the method according to an aspect of the invention.

With reference to FIGS. 2 and 3, each wheel 150 comprises a measurement module 160 which makes it possible to measure values of parameters of the wheel 150, for example the pressure or the temperature of the tire 140, and to communicate these data together with an identifier of said measurement module 160, to an onboard computer (not represented) once the wheel 150 has been fitted on an automotive vehicle. This measurement module 160 can be fitted on the rim 120 (FIG. 2) or on the tire 140 (FIG. 3).

With reference to FIG. 1, in order to check all or part of these parameters and in particular to obtain the identifier of the measurement module 160, each assembly line 10 comprises a diagnostic module 170 which is configured to communicate with the measurement modules 160 of the wheels 150 of the assembly facility 1.

More precisely, this diagnostic module 170 is fitted at the end of the assembly line 10 so as in particular to check the pressure of each tire 140 once fitted on the corresponding rim 120 and to associate the identifier of the measurement module 160 with the wheel 150, for example via a barcode label (not represented) stuck onto the rim 120 or onto the tire 140.

Each diagnostic module 170 is associated with a unique identifier, for example a string of alphanumeric characters, and is configured to emit, for example periodically, a signal comprising a request message destined for the measurement modules 160 of the assembly line 10 with which said diagnostic module 170 is associated.

The diagnostic module 170 is configured to emit this signal on a low-frequency communication link, known by the name LF (for "Low-Frequency") link so as to check the direction and the distance of emission of the signal (through its emission power) and thus dispatch the request message only to the measurement module 160 of the wheel 150 closest to the diagnostic module 170.

Each request message comprises the identifier of the assembly line 10 and an information item, for example in the form of a string of alphanumeric characters (preferably hexadecimal or binary), indicating in the form of a request code the parameters for which the diagnostic module 170 wishes to receive the values such as, for example, the temperature inside the tire 140, the pressure of the inflation gases of the tire 140, etc. Such a request code can comprise one or more commands selected from among a list of predefined commands which is known to the measurement module 160 so that the latter responds as a function of said command or commands received. The various commands may for example make it possible to cause the state of the measurement module 160 to change so that, for example, it measures the pressure or the temperature.

Each measurement module 160 is configured to receive, on an LF low-frequency radio interface, a signal emitted by the diagnostic modules 170 of the assembly facility 1 and comprising a request message.

Each measurement module 160 is configured to generate a response message, to encrypt at least one part of said response message by using as an encryption key the assembly line 10 identifier contained in the associated request message received and to dispatch a response message thus encrypted on a radiofrequency communication link, known by the name RF (for "Radio-Frequency") link.

The response message comprises in particular the identifier of the measurement module 160 which dispatches it, as well as the values of the parameters requested in the request message that the measurement module 160 has received.

Furthermore, the measurement module 160 is configured to emit spontaneously (that is to say without having received any request message beforehand) an information message, this information message being able to have the same characteristics as a response message. These information messages are characteristic of the standard mode of operation of the measurement module when it is fitted in a wheel which is itself fitted on a vehicle.

Such an information message may for example be emitted when a problem occurs with the pressure of the tire 140, when a motion of the wheel 150 is detected or else periodically (that is to say without any trigger event).

These information messages are intended for the normal operation of the measurement module 160 fitted in a wheel 150 in a vehicle so as:
- to alert the receiver of the vehicle (that is to say the computer on board the vehicle) of a variation of the pressure and to identify whether or not the new measured pressure is valid, for example to detect a puncture or a slow leak (pressure event),
- to periodically inform the computer of the vehicle during the rolling phases, for example of new values of pressure, temperature and/or acceleration (motion detection),
- to periodically inform during the vehicle stoppage phases of a new pressure value so as to anticipate a slow puncture, for example every 10 hours (periodic informing).

In the case of a pressure event, the measurement module 160 may for example perform pressure measurements periodically. When a pressure variation greater than a threshold (for example 8 kPa) is detected, the measurement module 160 changes mode and switches from a so-called "factory" standby mode to a so-called "normal" operating mode (standard mode of use) and emits a radiofrequency message on this occasion.

In the case of a motion detection, the measurement module 160 can perform acceleration measurements periodically, when it detects the exceeding of a threshold (for example 5 g), the measurement module 160 detects a rolling condition and transmits radiofrequency messages on transition and periodically (for example every 16 seconds).

Preferably, the measurement module 160 is configured to encrypt at least one part of the response message by inserting a checksum.

This checksum preferably corresponds to the sum of the identifier of the measurement module 160, of the values of the parameters measured by the measurement module (pressure, temperature, acceleration, etc.) and of the identifier of the assembly line 10.

More generally, the encryption carried out on all or part of the response message is an encryption of bijective type. Stated otherwise, each measurement module 160 uses the identifier of the assembly line 10 on a character string contained in the request message as a symmetric encryption key which will also be used by the diagnostic module 170 to decrypt it. By way of example, the encryption can be carried out on the basis of a binary operator of "exclusive or" ("XOR") or "and" ("AND") type, of a redundant cyclic code (CRC), of an encryption of AES type, or any other suitable symmetric encryption.

The diagnostic module 170 is configured to receive an encrypted response message dispatched by a measurement module 160 and to decrypt such an encrypted response message by using the identifier of the associated assembly line 10 as a decryption key in such a way as to ensure that the measurement module 160 is properly fitted on a wheel 150 of said assembly line 10. The diagnostic module 170 can thus no longer interpret a radiofrequency RF reception originating from a measurement module 160 of a wheel placed on another assembly line as being the response of the interrogated measurement module 160.

An aspect of the invention will now be described in its implementation.

Firstly, in a step E1, the diagnostic module 170 emits, destined for a given measurement module 160 of its assembly line 10, a signal comprising a request message comprising the identifier of the assembly line 10 with which it is associated as well as a request code which may for example specify that the diagnostic module 170 wishes to obtain the identifier of the measurement module 160 and a list of values of predefined parameters.

The measurement module 160 then receives this signal in a step E2.

Thereafter, in a step E3, the measurement module 160, having received the signal and interpreted the request message, generates, a response message comprising the identifier of said measurement module 160, the values of the parameters, measured by said measurement module 160, requested in the request message received, and a checksum corresponding to the sum of the identifier of the measurement module 160, of the value or values of the measured parameters and of the identifier of the assembly line 10.

The measurement module 160 encrypts thereafter, in a step E4, all or part of the response message generated by using the assembly line 10 identifier, included in the request message received, as an encryption key.

The measurement module 160 dispatches, in a step E5, the response message thus encrypted in a signal on a radiofrequency communication link.

After having received the encrypted response message dispatched by a measurement module 160 in a step E6, the diagnostic module 170 decrypts it by using in its turn the assembly line 10 identifier as a decryption key, in a step E7 so as to ensure that the measurement module 160 is associated with said assembly line so as to be able for example to store its identifier in a memory area.

Indeed, firstly, this allows the tire fitter to verify several parameters returned by the measurement module 160 such as for example the pressure of the inflated tire, its internal temperature, the state of the measurement module 160, its mode of operation, etc. Moreover, the identifier of the measurement module 160 can be associated with a barcode situated, for example, on a label stuck on the tire. Therefore, the pair consisting of the barcode and of the identifier of the measurement module 160 can then be stored in the memory area, for example a database, in order to be consulted subsequently. Thus, when the wheel 150 is assembled on a vehicle (for example in another factory), it will be possible to read back the barcode, deduce therefrom the identifier of the measurement module 160 (with the aid of the database) and verify with the aid of an LF interrogation around the car, that the associated measurement module 160 is indeed present.

A numerical example allowing a better understanding of the use of checksums will now be described. In this example, the request code is a string of hexadecimal characters, for example 7A 86 61 19 68 54, as is the identifier of the assembly line, for example 01.

The diagnostic module 170 therefore dispatches a compiled message comprising the request code, namely 7A 86 61 19 68 54 and the identifier of the assembly line 10, namely 01, i.e.: 7A 86 61 19 68 54 01.

For example, if the identifier of the measurement module is 40 and the values of the measured parameters (pressure, temperature, etc.) are 88 65 77 3B 01 47, the measurement module 160 computes firstly the checksum of these values which in this example is equal to A7 and then generates a response message by concatenating these values: 40 88 65 77 3B 01 47 A7 (identifier of the measurement module; values of the parameters; checksum).

The measurement module 160 thereafter encrypts the response message thus generated by computing a checksum corresponding to the exclusive sum (that is to say by using the "exclusive or" operator, also called XOR) of the response message generated and of the identifier (01) of the assembly line 10, i.e.: 7A 86 61 19 68 54 01.

40 88 65 77 3B 01 47 A7⊕01=40 88 65 77 3B 01 47 A6

When the diagnostic module 170 receives the response message dispatched by the measurement module 160, it decrypts it by carrying out firstly the exclusive sum of the response message and of its own identifier (01):

40 88 65 77 3B 01 47 A6⊕01=40 88 65 77 3B 01 47 A7

Once the response message has been decrypted, the diagnostic module 170 computes the checksum of the values of the fields corresponding to the concatenation of the identifier of the measurement module 160 and of the values of the measured parameters, i.e.:

40⊕88⊕65⊕77⊕3B⊕01⊕47=A7 which does indeed correspond here to the checksum inserted by the measurement module 160 into the response message. The diagnostic module 170 deduces therefrom that the measurement module 160 which dispatched the response message is indeed the measurement module 160 which was the addressee of the original request message.

When a diagnostic module 170 receives a message dispatched in a spontaneous or periodic manner by another measurement module 160, it decrypts it with its assembly line 10 identifier in the same manner. In this instance, after decryption, the diagnostic module 170 computes the checksum of the data received and compares it with the checksum received in the decrypted response message so as to be assured of the integrity of the data received.

Thus, for example, if the response message received is not encrypted with the identifier (01) of the assembly line 10, the encrypted response message received would be 40 88 65 77 3B 01 47 A7. When the diagnostic module 170 associated with the assembly line 10 identifier (01) firstly performs the decryption with its identifier on the checksum, it obtains:

40 88 65 77 3B 01 47 A7⊕01=40 88 65 77 3B 01 47 A6.

This being so, when said diagnostic module 170 verifies the checksum of the values of the fields corresponding to the concatenation of the identifier of the measurement module 160 and of the values of the measured parameters, it obtains:

40⊕88⊕65⊕77⊕3B⊕01⊕47=A7, different from A6.

Likewise, if the response message received is encrypted with another assembly line 10 identifier, for example with the identifier 02, the encrypted response message received would be 40 88 65 77 3B 01 47 A5. When the diagnostic module 170 associated with the assembly line 10 identifier (01) firstly performs the decryption with its identifier on the checksum, it obtains:

40 88 65 77 3B 01 47 A5⊕01=40 88 65 77 3B 01 47 A4.

Here again, when said diagnostic module 170 verifies the checksum of the values of the fields corresponding to the concatenation of the identifier of the measurement module 160 and of the values of the measured parameters, it obtains:

40⊕88⊕65⊕77⊕3B⊕01⊕47=A7, different from A4.

Thus, the computed checksum not being identical to the checksum received in the response message, the diagnostic module 170 considers that the response message received is not a response message in response to the dispatched request message that it dispatched and is therefore not utilized.

The method according to an aspect of the invention advantageously allows a diagnostic module 170 to distinguish a response message dispatched subsequent to the receipt of a request message from a response message dispatched by a measurement module 160 of another assembly line 10 or an information message not requested by the diagnostic module 170.

The invention claimed is:

1. A method for associating a diagnostic module of an assembly line for assembling automotive vehicle wheels with a measurement module fitted in a wheel assembled on said assembly line, said wheel being characterized by a plurality of parameters, the method comprising:
   transmitting, by a processor of the diagnostic module, over a communication link, a request message comprising an identifier of the assembly line with which said diagnostic module is associated and at least one request code in respect of a value of at least one wheel parameter, the identifier identifying the assembly line that the diagnostic module is monitoring,
   receiving, by a processor of the measurement module mounted to the wheel assembled on said assembly line, the transmitted request message,
   generating a response message by said processor of said measurement module, said response message comprising at least an identifier of said measurement module and a value of at least one parameter corresponding to the at least one request code inserted into the request message received,
   encrypting, by the processor of the measurement module, using the identifier of the assembly line as an encryption key, at least one part of the generated response message,
   transmitting, by the processor of the measurement module, over the communication link, the encrypted response message,
   receiving, by the processor of the diagnostic module, over the communication link; the response message transmitted, and
   decrypting, by the processor of the diagnostic module, the response message received by the diagnostic module by using the identifier of its assembly line as a decryption key to confirm that the measurement module is located in the wheel assembled on said assembly line.

2. The method as claimed in claim 1, in which the encryption comprises an insertion by the measurement module of a checksum into the response message.

3. The method as claimed in claim 2, in which the checksum corresponds to a sum of the identifier of the measurement module, of the value or values of the parameters corresponding to the request code inserted into the request message received and of the assembly line identifier received in the request message.

4. The method as claimed in claim 3, in which, the values of the parameters corresponding to the request code inserted into the request message received and of the identifier of the assembly line being hexadecimal or binary characters, the sum is carried out by applying an "exclusive or" operator or an "and" operator.

5. The method as claimed in claim 1, wherein the at least one parameter includes at least one of measurements from a wheel sensor in the measurement module, a state of the measurement module, or a mode of operation of the measurement module.

6. A measurement module intended to be fitted in an automotive vehicle wheel, said measurement module being characterized by an identifier and in that it is configured to:
  receive, from a processor of a diagnostic module, over a communication link, a request message comprising an identifier of an assembly line with which said diagnostic module is associated, and at least one request code in respect of a value of at least one wheel parameter, the identifier identifying the assembly line that the diagnostic module is monitoring,
  generate, by a processor of the measurement module mounted to the vehicle wheel assembled on the assembly line, a response message comprising at least an identifier of said measurement module and a value of at least one parameter corresponding to the request code inserted into a received request message,
  encrypt, by the processor of the measurement module, using the identifier of the assembly line as an encryption key, at least one part of the generated response message, and
  transmit, by the processor of the measurement module, over the communication link, the encrypted response message to the diagnostic module.

7. The measurement module as claimed in claim 6, configured to encrypt a part of the response message by inserting a checksum into said response message.

8. The measurement module as claimed in claim 7, in which the checksum corresponds to a sum of i) the identifier of said measurement module, ii) the value or values of the parameters measured by the measurement module and iii) the identifier of the assembly line.

9. A diagnostic module of an assembly line for assembling automotive vehicle wheels, said diagnostic module configured to:
  transmit, by a processor of the diagnostic module, over a communication link, a request message comprising an identifier of the assembly line with which said diagnostic module is associated and at least one request code in respect of a value of at least one wheel parameter, the identifier identifying the assembly line that the diagnostic module is monitoring,
  receive, by the processor of the diagnostic module, over the communication link, an encrypted response message transmitted by a processor of a measurement module mounted to a wheel assembled on said assembly line, said response message comprising at least an identifier of said measurement module and a value of at least one parameter corresponding to the request code inserted into a transmitted request message, and
  decrypt, by the processor of the diagnostic module, an encrypted message received by using the identifier of the assembly line as a decryption key to confirm that the measurement module is located in the wheel assembled on said assembly line.

10. The diagnostic module as claimed in claim 9, in which, a checksum corresponding to the sum of i) the identifier of a measurement module, ii) the value or values of the parameters and iii) the identifier of the assembly line being inserted into a response message received, the diagnostic module is configured to decrypt said response message by applying an operator to said checksum.

11. The diagnostic module as claimed in claim 10, in which the identifier of the assembly line includes a string of characters is hexadecimal or binary and the operator is of an "exclusive or" type or of an "and" type.

* * * * *